May 15, 1962 R. T. BUTLER 3,034,592
SUSPENSION APPARATUS FOR TANDEM-AXLE TRUCKS AND THE LIKE
Filed Nov. 30, 1959 2 Sheets-Sheet 1
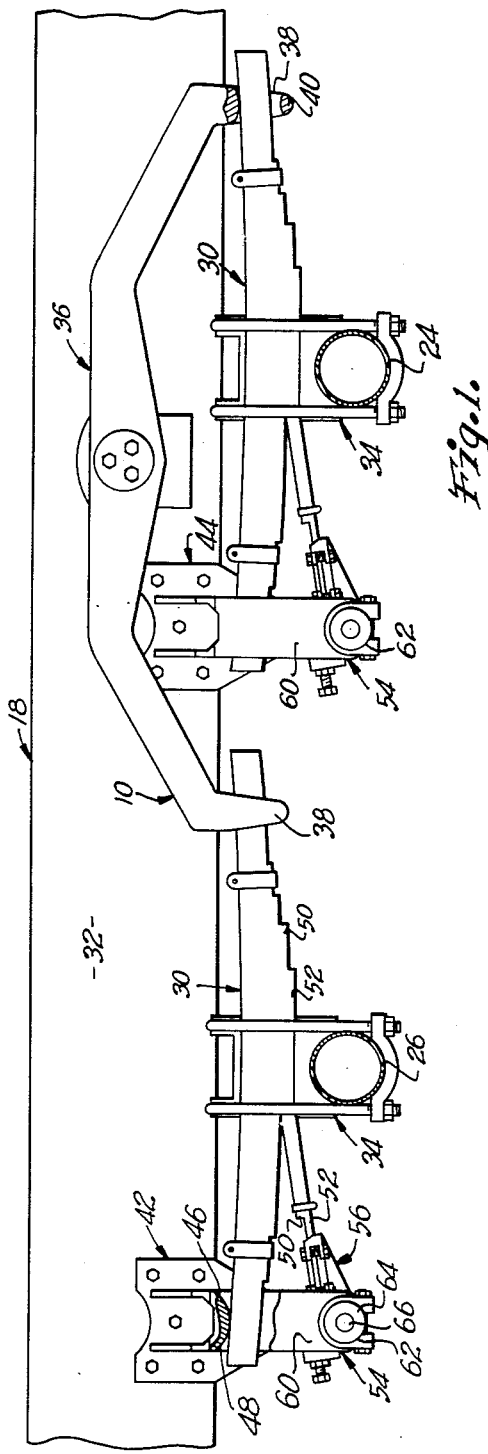
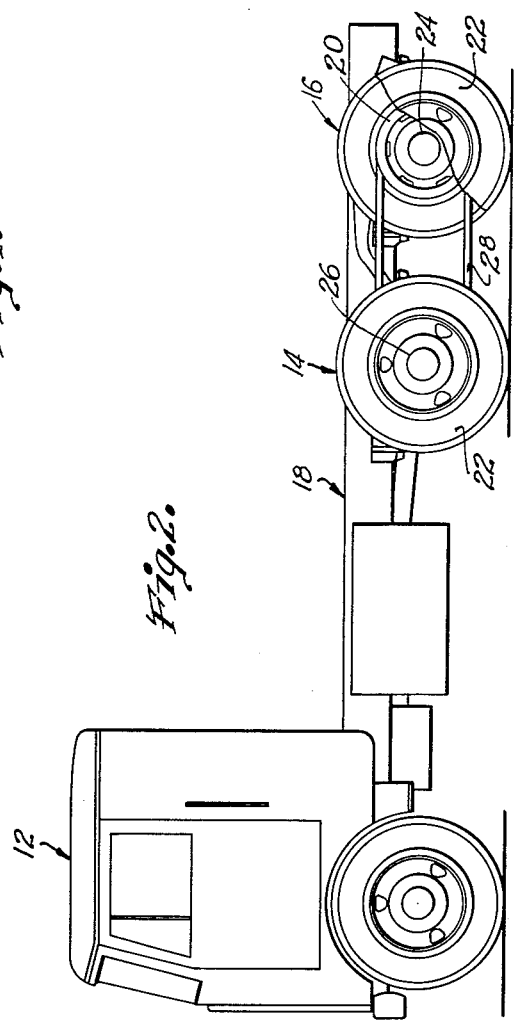
INVENTOR.
Ralph T. Butler
BY
Hovey, Schmidt, Johnson & Hovey
ATTORNEYS.

May 15, 1962     R. T. BUTLER     3,034,592
SUSPENSION APPARATUS FOR TANDEM-AXLE TRUCKS AND THE LIKE
Filed Nov. 30, 1959     2 Sheets-Sheet 2
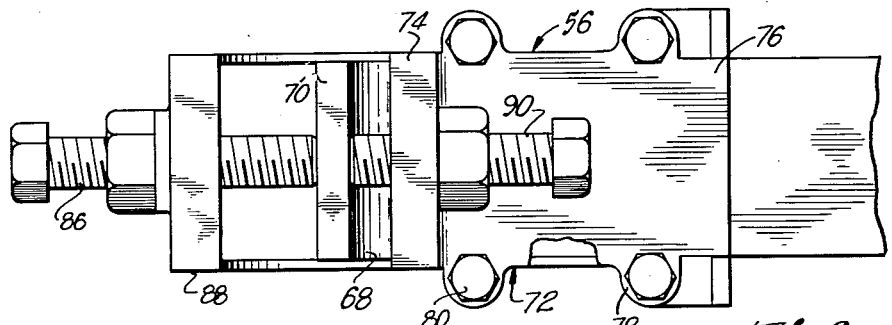
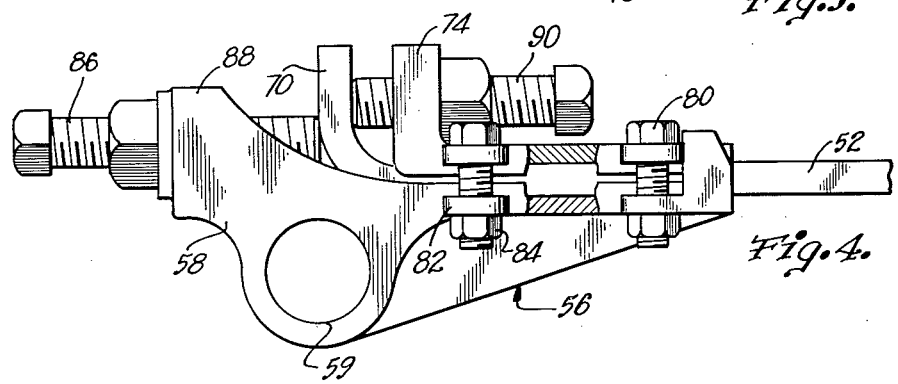
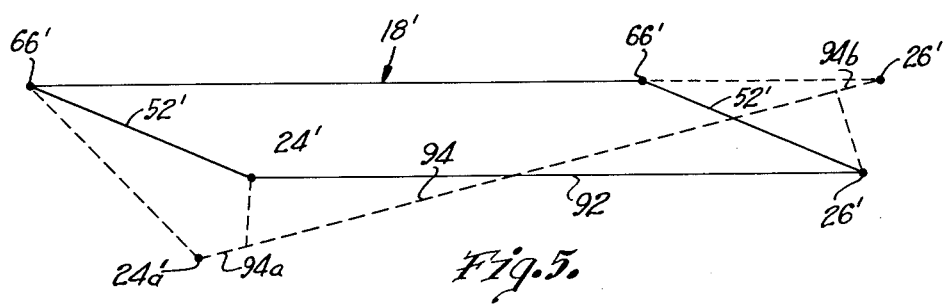
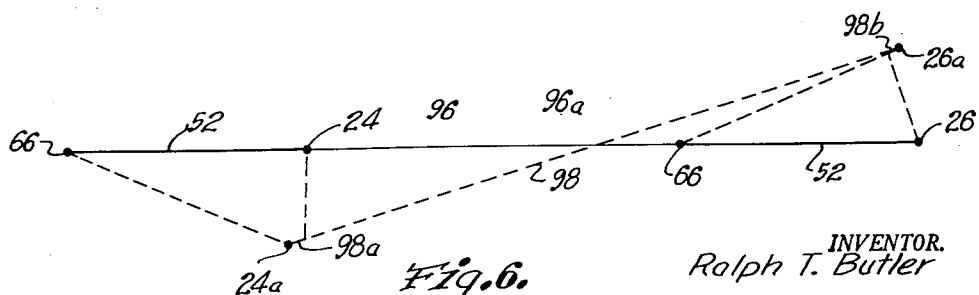
INVENTOR.
Ralph T. Butler
BY
Hovey, Schmidt, Johnson & Hovey
ATTORNEYS.

United States Patent Office 3,034,592
Patented May 15, 1962

3,034,592
SUSPENSION APPARATUS FOR TANDEM-AXLE TRUCKS AND THE LIKE
Ralph Theordore Butler, 2263 Bancroft, Springfield, Mo.
Filed Nov. 30, 1959, Ser. No. 856,038
6 Claims. (Cl. 180—22)

This invention relates to apparatus for suspending a pair of wheel and axle assemblies from the frame of a vehicle and has for its primary object to provide improved suspension structure for mounting tandem-axle drive assemblies on the tractor of a trailer truck, and which employs belt and pulley means interconnecting aligned pairs of wheels on each side of the frame and with minimum stress and strain being placed on the belt, notwithstanding vertical movement of the wheel and axle assemblies of the tandem unit in opposite directions during movement of the trailer truck.

With the advent of relatively lightweight, high power internal combustion engines, trailer trucks have been materially increased in size to carry as much weight as the various state laws legally permit. Most of such laws are based on a maximum weight for each axle of the truck and therefore, the utilization of tandem assemblies not only on the trailer but also on the tractor has become increasingly important. However, because of the difficulties of driving both of the axles of a tandem unit on a truck tractor from the engine, most tandem units of this character have a so-called dead axle which merely serves to more evenly distribute the weight of the forward part of the trailer over the roadbed.

In recent years, attempts have been made to increase the traction of the tandem unit forming a part of the truck tractor and also to increase the roadability of the truck, by employing belt drive means to drivingly interconnect opposed, aligned pairs of wheels on opposite sides of the tractor frame. This has normally been accomplished by placing pulleys over each of the axles between the pair of tires at each end thereof and then interconnecting aligned pulleys with suitable rubber V-belts in parallelism with the frame of the truck tractor.

Although the belt drive referred to above does produce the desired results of imparting traction to the former dead axle of the tractor, other problems arose by virtue of the fact that the axles of the tandem unit are individually sprung and therefore may move vertically in opposite directions during movement of the truck. Movement of the axles vertically away from each other increases the distance therebetweeen, thereby stretching the belts interconnecting opposed pairs of wheels and materially decreasing the longevity of the same and necessitating frequent replacement of such belts or time consuming and costly adjustment of the relative positions of the axles.

It is therefore a prime object of the instant invention to provide apparatus for suspending a pair of wheel and axle assemblies from the frame of a truck tractor which employs a V-belt drive between the drive axle and the normally dead axle, and with the suspension apparatus being constructed to minimize movement of the axles away from each other and thereby reducing the amount of stretching of the V-belts, without in any way hampering or interfering with normal vertical movement of the axles relative to the frame.

Also an important object of the invention is to provide suspension apparatus as described, wherein substantially uniform tension is maintained on the V-belts during vertical movement of the tandem axles and regardless of the position of the latter relative to the tractor frame.

An additional important object of the invention is to provide apparatus for suspending a pair of wheel and axle assemblies from the frame of a truck tractor which is adapted to fit all types and sizes of trucks or tractors without modification of the latter being required.

A still further important object of the invention is to provide improved suspension apparatus as described above which includes novel adjustment means permitting a maximum degree of adjustment of each of the axles on both sides of the truck or tractor for exact ninety degree alignment of the axles with the line of pull. In this connection, it is also an object to provide adjustment mechanism which permits relatively easy and simple adjustment of the tension of the V-belts used for driving the dead axle.

Also an important object of the invention is to provide novel torque means interconnecting the frame and each of the axles of the tandem unit with the point of connection of the torque means to bracket structure rigidly mounted on the frame, being substantially on a line through respective axes of the tandem unit axles when the truck is loaded, to thereby cause the axles to swing about such points and thereby materially decrease the distance the axles move apart during vertical reciprocation thereof as the truck is moved.

Other important objects and features of the present invention will become obvious or be explained in greater detail as the following specification progresses.

In the drawings:

FIGURE 1 is a fragmentary, side elevational view of suspension apparatus for mounting a pair of wheel and axle assemblies on the frame of a truck or tractor, with certain of the components being broken away and in section to reveal details of construction thereof;

FIG. 2 is a side elevational view of a truck tractor having the present suspension apparatus mounted on the frame thereof in the manner shown in FIG. 1 and illustrating the normal disposition of the V-belt means for drivingly interconnecting the power axle and the dead axle of the truck;

FIG. 3 is a fragmentary, enlarged, plan view of the adjustment mechanism utilized to connect the torque means of the suspension apparatus to bracket structure rigidly secured to the frame of the truck;

FIG. 4 is a side elevational view of the adjustment mechanism shown in FIG. 3;

FIG. 5 is a diagrammatic representation of the amount of distance which the axles of the tandem unit may move apart during vertical reciprocation of the axles in opposite directions, and with conventional torque means being employed to couple the axles to the frame of the truck; and FIG. 6 is a similar diagrammatic representation of the amount of distance the axles move apart when the present axle and wheel suspension apparatus is employed.

The suspension apparatus broadly designated 10 in the drawings, and illustrated in the preferred embodiment thereof, is especially adapted to be utilized on a truck tractor 12 for suspending a pair of wheel and axle assemblies 14 and 16 from the frame 18 on tractor 12.

As indicated in FIG. 2, a pulley 20 is preferably provided between each pair of wheels 22 at respective ends of axles 24 and 26 of assemblies 14 and 16 respectively, with a V-belt 28 being trained over corresponding pulleys 20 at opposed ends of axle 24 and 26.

Each of the axles 24 and 26 is provided with leaf spring means 30 adjacent opposed ends of axles 24 and 26 outboard of corresponding rails 32 of frame 18, with clamp means 34 serving to releasably secure opposed ends of axles 24 and 26 to corresponding spring means 30 intermediate the ends thereof.

Apparatus 10 preferably includes an equalizer bar 36 pivotally secured to the outer face of each of the rails 32 above axle 24 and having a pair of depending bifurcated sections 38 at opposed ends thereof and adapted to slidably receive respective ends of spring means 30 coupled to axles 24 and 26 at each end thereof, it being noted that pin means 40 extending across the lower end of each of the sections 38 serves to prevent the outer extremities of spring means 30 from shifting out of sections 38 during vertical reciprocation of axles 24 and 26.

Means for supporting the opposed ends of spring means 30 comprises a pair of substantially identical, horizontally spaced brackets 42 and 44 mounted on the outer face of each of the rails 32 adjacent the ends of corresponding spring means 30 opposed to the extremities thereof carried by equalizer bars 36. Bracket 44 on each side rail 32 is positioned behind a respective equalizer bar 36 and in closer proximity to section 38 adjacent axle 26, than the opposed section 38 at the other end of a respective equalizer bar 36. The other bracket 42 on each side rail 32 is located adjacent the front end of a respective spring means 30 coupled to axle 26. Each of the brackets 42 and 44 has a central passage 46 therethrough receiving an end of the corresponding spring means 30, with the upper leaf of each spring means 30 bearing against arcuate surface 48 of a part of brackets 42 and 44 defining passages 46 therethrough.

Spring means 30 are preferably of the type known as a "Hotchkiss drive spring" with the two lower leaves 50 and 52 thereof adjacent respective brackets 42 and 44 being bent downwardly from the main body of spring means 30 and releasably connected to the lower end 54 of each bracket 42 and 44. It is to be noted that each of the ends 54 of brackets 42 and 44 extends downwardly from a respective rail 32 a distance somewhat greater than the normal distance between the axes of axles 24 and 26 and the lower face of a corresponding rail 32 when the truck is loaded.

Adjustable means broadly numerated 56 for coupling each of the lower leaves 52 of spring means 30 to corresponding ends 54 of brackets 42 and 44, includes a main pivot member 58 provided with a central bore 59 therethrough and adapted to be positioned between opposed vertical, horizontally spaced, integrally interconnected segments 60 of brackets 42 and 44. As indicated in FIG. 1, segments 60 are provided with generally semicircular notches 62 in the lower extremities thereof in horizontally aligned relationship and adapted to receive a sleeve 64 having a central pin 66 extending through each of the sleeves 64 carried by opposed segments 60 of each bracket 42 and 44 and with pin 66 extending through bore 59 in a respective pivot member 58. It is to be understood that rubber bushing means is provided between each pin 66 and a corresponding member 58 in order to permit a limited degree of pivotal movement of member 58 with respect to brackets 42 and 44.

Member 58 has an upper, transversely U-shaped surface 68 of a width to receive the corresponding extremity of a leaf 52 therewithin, as best shown in FIG. 3. The outer end 70 of each of the leaves 52 is bent upwardly at substantially a right angle with respect to the main length of a respective leaf 52 projecting downwardly from the main body of the corresponding spring means 30, and a transversely L-shaped clamping plate 72 is disposed in overlying relationship to a respective leaf 52 with the upright leg 74 of plate 72 in parallelism with laterally extending end 70 of a leaf 52 and with the main plate portion 76 of clamping plate 72 having a number of outwardly extending lug portions 78 provided with perforations therein for clearing respective bolts 80 which also extend through outwardly extending aligned projections 82 integral with member 58. Nuts 84 threaded over the lowermost ends of each of the bolts 80 serve to maintain clamping plate 72 in firm engagement with the upper surface of a respective leaf 52 and thereby causing the latter to be maintained in frictional engagement with surface 68 of member 58. Adjustment screw 86 threaded through upright extension 88 of member 58 is disposed to engage end 59 of a respective leaf 52, while another adjustment screw 90 complementally threaded through leg 74 of clamping plate 72 also engages end 70 of a corresponding leaf 52 on the side thereof opposed to adjustment screw 86. As indicated in FIG. 3, screws 86 and 90 are in vertical alignment and permit longitudinal adjustment of leaf 52 relative to a corresponding member 58 upon loosening of bolt and nut means 80 and 84.

After mounting of suspension apparatus 10 on frame 18 of truck tractor 12, and including wheel and axle assemblies 14 and 16, bolts and nuts 80 and 84 are loosened to permit longitudinal adjustment of screws 86 and 90 of each of the members 58 until axles 24 and 26 are in parallel alignment in exact perpendicular relationship to the longitudinal lengths of rails 32 forming a part of frame 18. It is to be understood that when tractor 12 is connected to a trailer and the latter is loaded, spring means 30 mounted on axles 24 and 26 are deflected to positions as shown in FIG. 1, whereby the axes of axles 24 and 26 lie on horizontal lines through the axes of pins 66 carried by brackets 42 and 44. Thus, during vertical movement of axles 24 and 26 while tractor 12 is driven over a road or the like, torque means in the nature of leaves 50 and 52 of spring means 30 being coupled directly to brackets 42 and 44 respectively, cause axles 24 and 26 to swing about respective axes of pin 66 mounted on the lower extremities 54 of brackets 42 and 44.

Since equalizer bar 36 is employed to compensate for individual vertical movement of axles 24 and 26, it can be seen that as axle 24 moves downwardly, axle 26 is caused to move upwardly to compensate for the change in position of axle 24. During such vertical movement, axles 24 and 26 do not move apart a great distance horizontally because both of such axles are pivoting about points lying on a line which normally passes through the axes of axles 24 and 26 when truck 12 is loaded.

The effect of pivoting movement of axles 24 and 26 about pins 66 which lie on lines through the axes of axles 24 and 26 when truck 12 is loaded, is best illustrated in FIGS. 5 and 6. Assuming that FIG. 5 represents the conventional method of suspending tandem-axles 24' and 26' from frame 18' and with torque or radius rods 52' being employed to pivotally join respective axles 24' and 26' to frame 18' as at 66', it can be seen that during vertical movement of axles 24' and 26' the latter are caused to swing about pivot points 66'. The normal distance between axles 24' and 26' when truck 12 is loaded is indicated by line 92, but when axle 24' moves downwardly to a position represented by 24a' and axle 26' moves upwardly to a position represented by 26a', it can be seen that dotted line 94 represents the distance between axles 24' and 26' at this moment. The difference in length between lines 92 and 94 is equal to the dotted line segments 94a and 94b and which total the extent to which belt 28 at each end of axles 24' and 26' must stretch in order to compensate for up and down movement of axles 24' and 26'.

Through utilization of apparatus 10 constituting the subject matter of the present invention, it can be seen that after loading of truck 12, axles 24 and 26 lie on a line 96 which also passes through pins 66 which are coupled to respective axles 24 and 26 by torque means 52. Thus, during downward movement of axle 24 to position 24a, axle 24 swings about respective pivot pin 66 while during simultaneous upward movement of axle 26 to position 26a, such axle pivots about a corresponding pin 66. The normal distance between axles 24 and 26 prior to vertical movement thereof, is designated by 96a which is equal to the distance between the axes of axles 24 and 26, while the distance between such axles at the time that axle 24 is at position 24a and axle 26 is at location 26a is represented by line 98, with the increase in length thereof over line 96a being represented by 98a and 98b. It can therefore be seen that belt 28 at each end of axles 24 and 26 is not subjected to nearly as great stretching as occasioned by utilization of suspension apparatus as indicated by FIG. 5.

Not only does the adjustment mechanism illustrated in FIGS. 3 and 4 permit adjustment and maintenance of axles 24 and 26 in parallelism and perpendicular to the longitudinal length of frame 18, but after extended use of V-belts 28, the tension on the same may be increased as necessary by shifting one or both of the axles 24 and 26 in horizontal directions.

Although apparatus 10 has been illustrated and described as utilizing Hotchkiss drive type spring means 30 wherein leaves 50 and 52 are coupled to brackets 42 and 44 respectively, it is to be understood that adjustable torque or radius rods may be substituted with equally good results being obtained. The principal consideration is disposition of pivot pin 66 on a line through the axes of axles 24 and 26 when truck 12 is loaded. Other modifications such as the above may be made in suspension apparatus 10 without departing from the spirit of the invention, and it is intended, therefore, to be limited only by the scope of the appended claims.

Having thus described the invention what is claimed as new and desired to be secured by Letters Patent is:

1. In a vehicle having a frame provided with tandem wheel and axle assemblies including a pair of axles, pulleys at each end of respective axles, secured to corresponding opposed wheels for rotation therewith and a belt trained over aligned pulleys on opposite sides of the frame, the improvement of which comprises apparatus for supporting the axles for alternate upward and downward movement toward and away from the frame and in substantially parallel, uniformly spaced relationship throughout movement thereof, to maintain generally uniform tension on the belt with minimum stretching thereof, said apparatus comprising spring means adapted to be secured to the outer end portions of each of the axles in transversely extending relationship thereto; an equalizer overlying respective spring means on opposite sides of said frame and in alignment transversely thereof, said equalizers being adapted to be swingably secured intermediate the ends thereof to the frame for pivoting movement about a common axis transversely of the frame, opposed ends of the equalizers terminating adjacent and positioned in supporting relationship to respective extremities of the spring means disposed in tandem relationship on corresponding sides of the frame; bracket means adapted to be rigidly secured to the frame adjacent the extremities of said spring means opposite to the extremities supported by opposed ends of said equalizers, said brackets being provided with means thereon supporting the proximal extremities of said spring means; elongated, substantially non-extensible torque means rigidly coupled to each of said spring means adjacent respective axles carried thereby and extending outwardly from said axles toward corresponding brackets supporting said spring means; and means pivotally connecting the outermost extremities of said torque means to corresponding proximal brackets, said torque means being positioned to cause the axes of pivoting thereof to be located in a common horizontal plane extending through the axes of said axles when the vehicle is loaded to thereby minimize the distance said axles move away from each other longitudinally of the frame as the wheel and axle assemblies shift toward and away from the frame in alternate directions.

2. Apparatus as set forth in claim 1 wherein is provided means adjustably securing respective ends of said torque means at various locations thereon to said bracket to permit selective changing of the effective length of each of said torque means.

3. Apparatus as set forth in claim 1 wherein said spring means each include a number of leaves in stacked, superimposed relationship, said torque means comprising at least one of the leaves of each of the spring means, said one leaf of each of the spring means being connected to a respective proximal bracket and provided with a laterally extending section at the outermost end thereof remote from a proximal axle, and adjustable means on each of said brackets receiving said one leaf connected thereto for securing the latter to a respective bracket.

4. Apparatus as set forth in claim 3 wherein said adjustable means for securing a respective one leaf to each bracket includes an L-shaped unit provided with a first leg releasably engaging and securing said one leaf to a corresponding bracket and having a laterally extending second leg in spaced, substantial parallelism with the proximal section of said one leaf, there being an adjusting screw threadably passing through said second leg and engaging said proximal section of the one leaf.

5. Apparatus as set forth in claim 4 wherein is provided a second adjusting screw threadably mounted on each of the brackets and engaging the section of said one leaf secured to a respective element on the face of said section opposite to that engaged by a respective first screw.

6. In a vehicle having a frame provided with tandem wheel and axle assemblies including a pair of axles, pulleys at each end of respective axles, secured to corresponding opposed wheels for rotation therewith and a belt trained over aligned pulleys on opposite sides of the frame, the improvement of which comprises apparatus for supporting the axles for alternate upward and downward movement toward and away from the frame and in substantially parallel, uniformly spaced relationship throughout movement thereof, to maintain generally uniform tension on the belt with minimum stretching thereof, said apparatus comprising spring means adapted to be secured to the outer end portions of each of the axles and positioned above the latter in transversely extending relationship thereto; bracket means adapted to be rigidly mounted on opposed sides of said frame and supporting said spring means at the forwardmost ends thereof in positions permitting the axles to shift relative to the frame and against the action of corresponding spring means, said bracket means including elements extending downwardly from the frame in spaced relationship to respective axles on one side of corresponding spring means, each of said spring means including a number of leaves disposed in stacked, superimposed relationship, at least one of the leaves of each spring means being pivotally connected to respective elements in sufficiently spaced relationship to the proximal extremity of the remaining leaves of said spring means to present torque means pivotal about axes on the brackets located in a common horizontal plane extending through the axes of said axles when the vehicle is loaded to thereby minimize the distance said axles move away from each other longitudinally of the frame as the wheel and axle assemblies shift toward and away from the frame in alternate directions; and an equalizer bar for each of the frames and adapted to be pivotally mounted intermediate the ends thereof on the frame, said bar being operably coupled at the ends thereof to the rearmost ends of the spring means.

References Cited in the file of this patent

UNITED STATES PATENTS

| | | |
|---|---|---|
| 1,271,871 | Einung | July 9, 1918 |
| 2,280,302 | Reid | Apr. 21, 1942 |
| 2,655,388 | Nabors | Oct. 13, 1953 |
| 2,736,571 | Compton | Feb. 28, 1956 |
| 2,919,757 | Bonnin | Jan. 5, 1960 |